US006989925B2

(12) United States Patent
Karasawa

(10) Patent No.: US 6,989,925 B2
(45) Date of Patent: Jan. 24, 2006

(54) DARK FIELD ILLUMINATION DEVICE

(75) Inventor: Masayoshi Karasawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/861,813

(22) Filed: Jun. 4, 2004

(65) Prior Publication Data
US 2004/0252372 A1 Dec. 16, 2004

(30) Foreign Application Priority Data
Jun. 12, 2003 (JP) .............................. 2003-168079

(51) Int. Cl.
*G02B 21/06* (2006.01)
*G02B 21/00* (2006.01)
(52) U.S. Cl. ..................... 359/387; 359/368; 359/385
(58) Field of Classification Search ........ 359/368–390, 359/601–614; 362/241–268
See application file for complete search history.

(56) References Cited

U.S. PATENT DOCUMENTS

| 2,415,732 A | | 2/1947 | Domingo ................. 359/387 |
| 3,920,311 A | * | 11/1975 | Tsuda et al. ............. 359/387 |
| 4,659,193 A | * | 4/1987 | Nagano .................... 359/387 |
| 4,737,022 A | * | 4/1988 | Faltermeier et al. ...... 359/387 |
| 5,268,749 A | * | 12/1993 | Weber et al. ............. 356/446 |
| 5,741,213 A | * | 4/1998 | Kouchi et al. ........... 600/310 |
| 5,982,534 A | | 11/1999 | Pinkel et al. ............. 359/387 |
| 5,997,164 A | | 12/1999 | Betts et al. .............. 362/575 |
| 6,594,076 B2 | * | 7/2003 | Satou ...................... 359/388 |

FOREIGN PATENT DOCUMENTS

| JP | 45-11051 | 5/1970 | |
| JP | 11-153755 A | 6/1999 | |
| JP | 2000-19411 | * 1/2000 | ........... 359/387 |
| WO | WO 00/03283 A2 | 1/2000 | |

* cited by examiner

*Primary Examiner*—Thong Q Nguyen
(74) *Attorney, Agent, or Firm*—Frishauf, Holtz, Goodman & Chick, P.C.

(57) ABSTRACT

A dark field illumination device comprises an illumination light source, which emits illumination light rays, a light shielding plate, which is located between the sample and the illumination light source, and selectively shields the illumination light rays directly entering the observation optical system among the illumination light rays emitted from the illumination light source, an optical member, which directs, toward the sample, the illumination light rays passing outside the illumination light rays shielded by the light shielding plate, and a background member, which is disposed between the sample and the light shielding plate, and has a smooth surface on a side of the sample.

9 Claims, 4 Drawing Sheets

DARK FIELD ILLUMINATION DEVICE

CROSS-REFERENCE TO RELATED APPLICATIONS

This application is based upon and claims the benefit of priority from prior Japanese Patent Application No. 2003-168079, filed Jun. 12, 2003, the entire contents of which are incorporated herein by reference.

BACKGROUND OF THE INVENTION

1. Field of the Invention

The present invention relates to a dark field illumination device of a microscope.

2. Description of the Related Art

Dark field observation is generally used when a sample containing pure substances having translucency and optical anisotropic substances is observed with a microscope.

The dark field observation is a method of observing only scattered light from the sample by preventing illumination light from directly entering observation optical system, so that, in an observed image, only the scattered light can be seen in the darkness.

At this point, if light rays other than the scattered light of the sample enters the observation optical system, a background of the observed image will not be completely dark, leading to decreased contrast and making it difficult to detect the scattered light of the targeted sample. It is thus important to prevent unnecessary light rays from entering the observation optical system in the dark field observation.

Jpn. UM. Appln. KOKOKU Publication No. 45-11051 discloses an illumination device for performing the dark field observation. FIG. 5 shows a sectional configuration of the illumination device for performing the dark field observation disclosed in this document.

In the illumination device shown in FIG. 5, a switch lever 22 for bright field/dark field is placed above an illumination light source 18 during dark field observation. This shields only the illumination light rays directly entering the observation optical system among the illumination light rays emitted from the illumination light source 18. Other illumination light rays are reflected toward a sample 30 by an inner surface of a reflecting mirror 19, and illuminate the sample 30. At this moment, in order to prevent light rays in light paths other than designed light paths from striking on the switch lever 22 for bright field/dark field and being scattered to enter the observation optical system, a light shielding portion 31 is disposed to prevent the light rays in light paths other than the originally designed light paths from entering the observation optical system.

The unnecessary reflected illumination light rays that have penetrated the sample 30 moves upward in the drawing without entering the observation optical system. As a result, the dark field observation can be achieved in which only the scattered light of the observed image can be seen in the dark field.

Furthermore, Jpn. Pat. Appln. KOKAI Publication No. 11-153755 discloses an illumination device for performing the dark field observation. FIG. 6 shows a sectional configuration of the illumination device for performing the dark field observation disclosed in this document.

In the illumination device shown in FIG. 6, a light shielding portion 36 is disposed between an illumination light source 34 and an objective lens 39 as the observation optical system. The light shielding portion 36 only shields illumination the light rays directly entering the objective lens 39 among the illumination light rays emitted from the illumination light source 34. Other illumination light rays are reflected toward a sample 38 by an inner wall surface 35a formed inside a reflecting mirror 35, and illuminate the sample 38.

The disadvantageous reflected illumination light rays that have penetrated the sample 38 moves upward in the drawing without entering the objective lens 39. As a result, the dark field observation is achieved in which only the scattered light of the observed image can be seen in the darkness.

In many cases, the sample is held with a glass plate or a glass container. Moreover, a dustproof waterproof glass to prevent entrance of dust and water into the illumination device is provided between the sample and a light shielding plate. Thus, a glass member is generally present between the sample and the illumination light source. Therefore, part of the illumination light rays that illuminate the sample is again reflected toward the illumination light source by the glass surface. Part of the reflected light rays falls on the light shielding plate and is diffused, and part of the diffused light enters the objective lens to decrease the contrast of the observed image.

Furthermore, as the scattered light emitted from the sample is faint in the dark field observation, improvements are increasingly made in brightness of an illumination system, such as employment of a brighter light source or adjustment of the illumination system. This, on the other hand, increases an amount of light rays that are again reflected toward the light source side by the glass surface, so that the decrease of contrast mentioned above has become a more significant problem.

BRIEF SUMMARY OF THE INVENTION

The present invention is directed to a dark field illumination device to provide dark field illumination to a sample to be observed by observation optical system. The dark field illumination device of the present invention comprises an illumination light source, which emits illumination light rays, a light shielding plate, which is located between the sample and the illumination light source, and selectively shields the illumination light rays directly entering the observation optical system among the illumination light rays emitted from the illumination light source, an optical member, which directs, toward the sample, the illumination light rays passing outside the illumination light rays shielded by the light shielding plate, and a background member, which is disposed between the sample and the light shielding plate, and has a smooth surface on a side of the sample.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
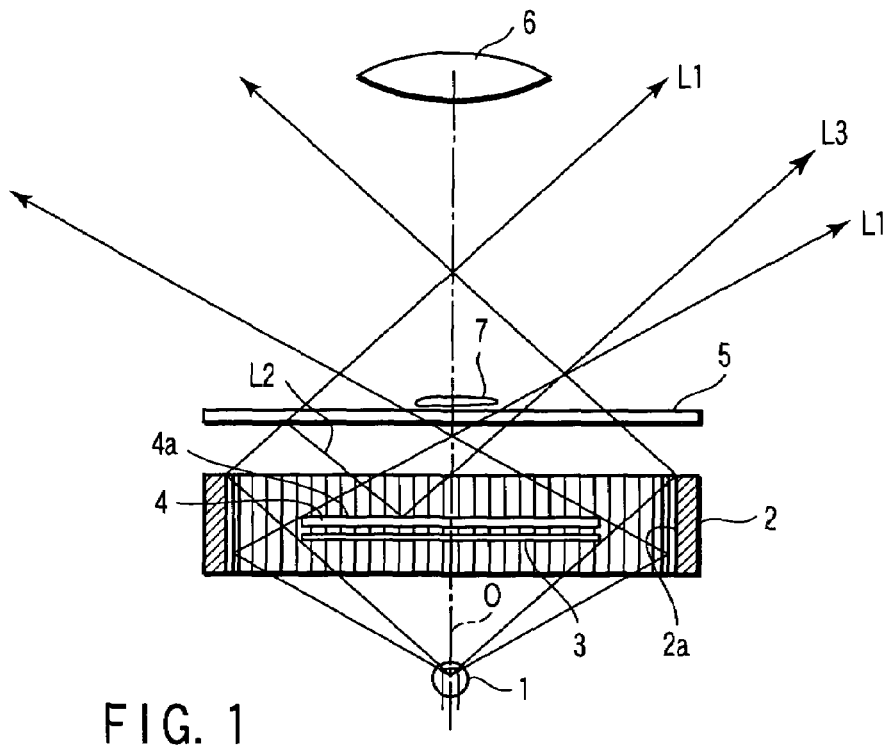
FIG. 1 shows a sectional configuration of a dark field illumination device in a first embodiment of the present invention.

Embodiments of the present invention will be described below referring to the drawings.

First Embodiment

The present embodiment is directed to a dark field illumination device for providing dark field illumination to a sample observed by observation optical system. FIG. 1 shows a sectional configuration of the dark field illumination device in a first embodiment of the present invention.

As shown in FIG. 1, a sample 7 is mounted on a stage glass 5. The observation optical system to observe the sample 7 includes, for example, an objective lens 6 of a microscope. The objective lens 6 is disposed above the sample 7. The dark field illumination device of the present embodiment is located on the opposite side of the objective lens 6 of the observation optical system with reference to the stage glass 5, that is, located below the stage glass 5.

The dark field illumination device of the present embodiment comprises an illumination light source 1, which emits illumination light rays, a light shielding plate 3, which shields part of the illumination light rays emitted from the illumination light source 1, an absorption-type ND filter 4 (a light transmittance of 20% or lower), and a cylindrical dark field mirror 2 surrounding the light shielding plate 3 and the ND filter 4.

The illumination light source 1, the light shielding plate 3 and the ND filter 4 are all located on an optical axis O of the objective lens 6.

The light shielding plate 3 is located between the sample 7 and the illumination light source 1, and selectively shields the illumination light rays directly entering the objective lens 6 among the illumination light rays emitted from the illumination light source 1.

The cylindrical dark field mirror 2 has its inside diameter larger than the light shielding plate 3 and the ND filter 4, and its inner surface 2a is a mirror and directs, toward the sample 7, the illumination light rays passing outside the illumination light rays shielded by the light shielding plate 3 (i.e., reflects them toward the sample 7). Thus, the illumination light rays are equally applied to the sample 7 from its periphery.

The ND filter 4 is disposed between the sample 7 and the light shielding plate 3, and has a smooth surface 4a on the side of the sample 7.

In FIG. 1, among the illumination light rays emitted from the illumination light source 1, the illumination light rays directly heading to the sample 7 are shielded by the light shielding plate 3, and can not reach the sample 7. Further, the illumination light rays L1 reflected by the inner surface 2a of the dark field mirror 2 pass outside the ND filter 4 and penetrate the stage glass 5. Part of the illumination light rays L1 strikes on the sample 7, while the rest escape out of a microscope device without entering the objective lens 6 of the observation optical system. The illumination light rays L1 struck on the sample 7 illuminate the sample 7, and are scattered at the sample 7.

Part of the scattered light from the sample 7 enters (an aperture of) the objective lens 6, and is magnified and observed by the observation optical system (not shown) including the objective lens 6. The light shielding plate 3 shields the light of the illumination light source 1, so that a magnified and viewed field of the observation optical system will have a dark background, and thus the scattered light from the sample 7 is observed in the dark background.

In the amount of illumination light rays L1 reflected by the dark field mirror 2, 1–5 percent is reflected on a surface of the stage glass 5 that is on the side of the illumination light source 1 and on a surface that is on the side of the sample 7. The illumination light rays L2 reflected by the stage glass 5 mostly enter the ND filter 4. Since a surface of the ND filter 4 on the side of the sample 7 is the smooth surface 4a, the illumination light rays L2 entering the ND filter 4 are hardly scattered on the surface of the ND filter 4 that is on the side of the sample 7, i.e., the smooth surface 4a. Therefore, the illumination light rays L2 that have entered the ND filter 4 mainly penetrate the smooth surface 4a without being scattered and enter the ND filter 4, and are then sufficiently attenuated due to light absorption of the ND filter 4. Moreover, roughly 1–10 percent of the illumination light rays L2 that have entered the ND filter 4 is reflected on the smooth surface 4a and therefore does not pass through the smooth surface 4a to enter the ND filter 4. However, such illumination light rays L3 are reflected without being scattered on the smooth surface 4a, pass outside (the aperture of) the objective lens 6, and escape out of the microscope device.

As apparent from the description so far, in the dark field illumination device of the present embodiment, because the ND filter 4 has the smooth surface 4a on the side of the sample, the illumination light rays L2 reflected by the stage glass 5 enter the ND filter 4 and are then absorbed by the ND filter 4 without being scattered, or are reflected by the smooth surface 4a to escape out of the observation optical system. As a result, undesired light rays are effectively prevented from entering the observation optical system. This enables dark field observation with the dark background and satisfactory contrast. Therefore, according to the present embodiment, the dark field illumination device that enables the dark field observation with the satisfactory contrast without being affected by improvement of brightness of illumination light is provided.

In the dark field illumination device of the present embodiment, the ND filter 4 can be easily disposed near the light shielding plate 3 without any problem, and can therefore be compactly built along the optical axis.

In addition, the stage glass 5 can be removed, and the smooth surface 4a of the absorption-type ND filter 4 can be easily cleaned, so that optically diffused objects such as dust and stains sticking to the smooth surface 4a of the ND filter 4 can be easily removed. It is thus possible to successively obtain the dark field observation with the dark background and satisfactory contrast.

The present embodiment can be variously changed, modified and improved as in modifications described below.

First Modification

The absorption-type ND filter 4 in the dark field illumination device of the present embodiment may be replaced with an interference-type ND filter having a smooth surface on the side of the sample 7. The interference-type ND filter has a light transmittance of, for example, 20% or lower. An interference film of the interference-type ND filter may be formed either on a surface on the side of the sample 7 or a surface on the side of the illumination light source 1.

Also in the present modification, the illumination light rays L2 that have fallen on the interference-type ND filter are hardly scattered because the interference-type ND filter has the smooth surface on the side of the sample 7. The illumination light rays that have entered the interference-type ND filter repeat interference and are attenuated. Further, the illumination light rays reflected by the interference-type ND filter escape out of the objective lens 6.

This enables the dark field observation with the dark background and satisfactory contrast, as in the present embodiment.

Second Modification

The absorption-type ND filter 4 in the dark field illumination device of the present embodiment may be replaced with a light absorbing member, which has a smooth surface on the side of the sample 7, and attenuates light by absorbing it. The light absorbing member may comprise an acrylic plate or a window film, for example, having a light transmittance of 0% to 20%.

Also in the present modification, the illumination light rays L2 that have fallen on the light absorbing member are hardly scattered because the light absorbing member has the smooth surface on the side of the sample 7. The illumination light rays that have entered the light absorbing member are absorbed and attenuated. Further, the illumination light rays reflected by the light absorbing member escape out of the objective lens 6.

This enables the dark field observation with the dark background and satisfactory contrast, as in the present embodiment. In addition, reduction effects are obtained in costs of components.

Third Modification

The absorption-type ND filter 4 in the dark field illumination device of the present embodiment may be replaced with a mirror having a smooth mirror surface on the side of the sample 7. In other words, the smooth surface may be the mirror surface.

Also in the present modification, the illumination light rays L2 that have fallen on the mirror are hardly scattered because the mirror has the smooth surface on the side of the sample 7. The illumination light rays that have fallen on the mirror are reflected and escape out of the objective lens 6.

This enables the dark field observation with the dark background and satisfactory contrast, as in the present embodiment.

Fourth Modification

The ND filter (and its substitute members) in the dark field illumination device of the present embodiment (and its first modification to third modification) may further have an anti-reflection film provided on the smooth surface.

In the present modification, the illumination light rays L2 that have fallen on the smooth surface enter the anti-reflection film and are attenuated by interference. This reduces the amount of illumination light rays reflected by the smooth surface. Moreover, the illumination light rays that have entered the ND filter or the like are more suitably absorbed.

This enables the dark field observation with the dark background and satisfactory contrast.

Fifth Modification

The absorption-type ND filter 4 in the dark field illumination device of the present embodiment may be replaced with a hair transplant cloth. The hair transplant cloth is a cloth in which countless numbers of hairs are vertically transplanted, and the hair itself has a low reflectance, and the countless numbers of hairs have parts where they overlap each other. Therefore, the hair transplant cloth hardly scatters and reflects the fallen light.

In the present modification, the illumination light rays fallen on the hair transplant cloth are hardly scattered and hardly reflected.

This enables the dark field observation with the dark background and satisfactory contrast, as in the present embodiment.

Second Embodiment

Figure 2:
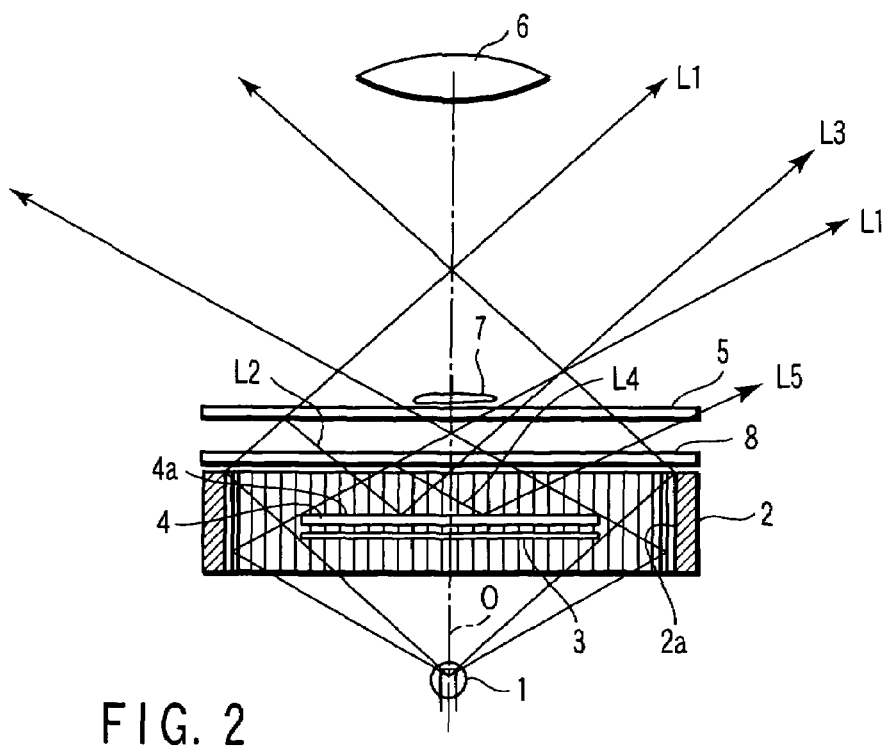
FIG. 2 shows a sectional configuration of the dark field illumination device in a second embodiment of the present invention.

The present embodiment is directed to another dark field illumination device. FIG. 2 shows a sectional configuration of the dark field illumination device in a second embodiment of the present invention. In FIG. 2, members indicated by the same reference numerals as the members shown in FIG. 1 are similar members, and will not be described in detail.

As shown in FIG. 2, the dark field illumination device of the present embodiment further comprises a dustproof waterproof glass 8, which is disposed between the dark field mirror 2 and the stage glass 5, in addition to the configuration of the dark field illumination device in the first embodiment. While the stage glass 5 can be removed, the dustproof waterproof glass 8 is fixed to a main body of a microscope illumination stand and prevents pollutants such as dust and water from entering the illumination stand main unit.

The dustproof waterproof glass 8 reflects part of the illumination light rays L1 reflected by an inner surface 2a of the dark field mirror 2. Part of the illumination light rays L4 reflected by the dustproof waterproof glass 8 falls on the ND filter 4 (and its substitute members). The illumination light rays L4 that have fallen on the ND filter (and its substitute members) are hardly scattered because the ND filter 4 (and its substitute members) has the smooth surface on the side of the sample 7. The illumination light rays L5 reflected by the ND filter 4 (and its substitute members) escape out of the objective lens 6. Further, the illumination light rays that have entered the ND filter 4 (and its substitute members except for the mirror) are attenuated.

The dark field illumination device of the present embodiment has the dustproof waterproof glass 8 in addition to the same advantage as in the first embodiment, so that stains on the ND filter 4 (and its substitute members) are effectively prevented.

The present embodiment may be variously changed, modified and improved as in modifications described below.

First Modification

The dustproof waterproof glass 8 in the dark field illumination device of the present embodiment may further have an anti-reflection film provided on its surface.

In the present modification, because the dustproof waterproof glass 8 has the anti-reflection film, the amount of illumination light rays reflected toward the illumination light source 1 by the dustproof waterproof glass 8 is reduced.

This enables the more suitable dark field observation with the dark background and satisfactory contrast.

Second Modification

The dustproof waterproof glass 8 in the dark field illumination device of the present embodiment may be replaced with various kinds of optical members. Moreover, such various kinds of optical members may be disposed between the ND filter 4 (and its substitute members) and the stage glass 5.

In the present modification, advantages, optical functions and the like peculiar to the various kinds of added optical members can be added to the present embodiment.

Third Embodiment

The present embodiment is directed to partial modifications of the dark field illumination device of the first embodiment and the dark field illumination device of the second embodiment.

The dark field illumination device of the present embodiment has a configuration in which the light shielding plate 3 is removed from the configuration of the dark field illumination device of the first embodiment and the dark field illumination device of the second embodiment, but the ND filter 4 (and its substitute members) has the same function as the light shielding plate 3 instead. In other words, the light shielding plate and the ND filter (and its substitute members) constitute one component.

The ND filter (and its substitute members) in the present embodiment has a light transmittance of 0% with respect to the illumination light from the side of the illumination light source 1.

In the present embodiment, since the ND filter (and its substitute members) also serves as the light shielding plate, it is possible to obtain such advantages as a reduction in the number of components, a reduction in component prices and a reduction in the number of assembly processes, as compared with the first embodiment and the second embodiment.

Fourth Embodiment

Figure 3:
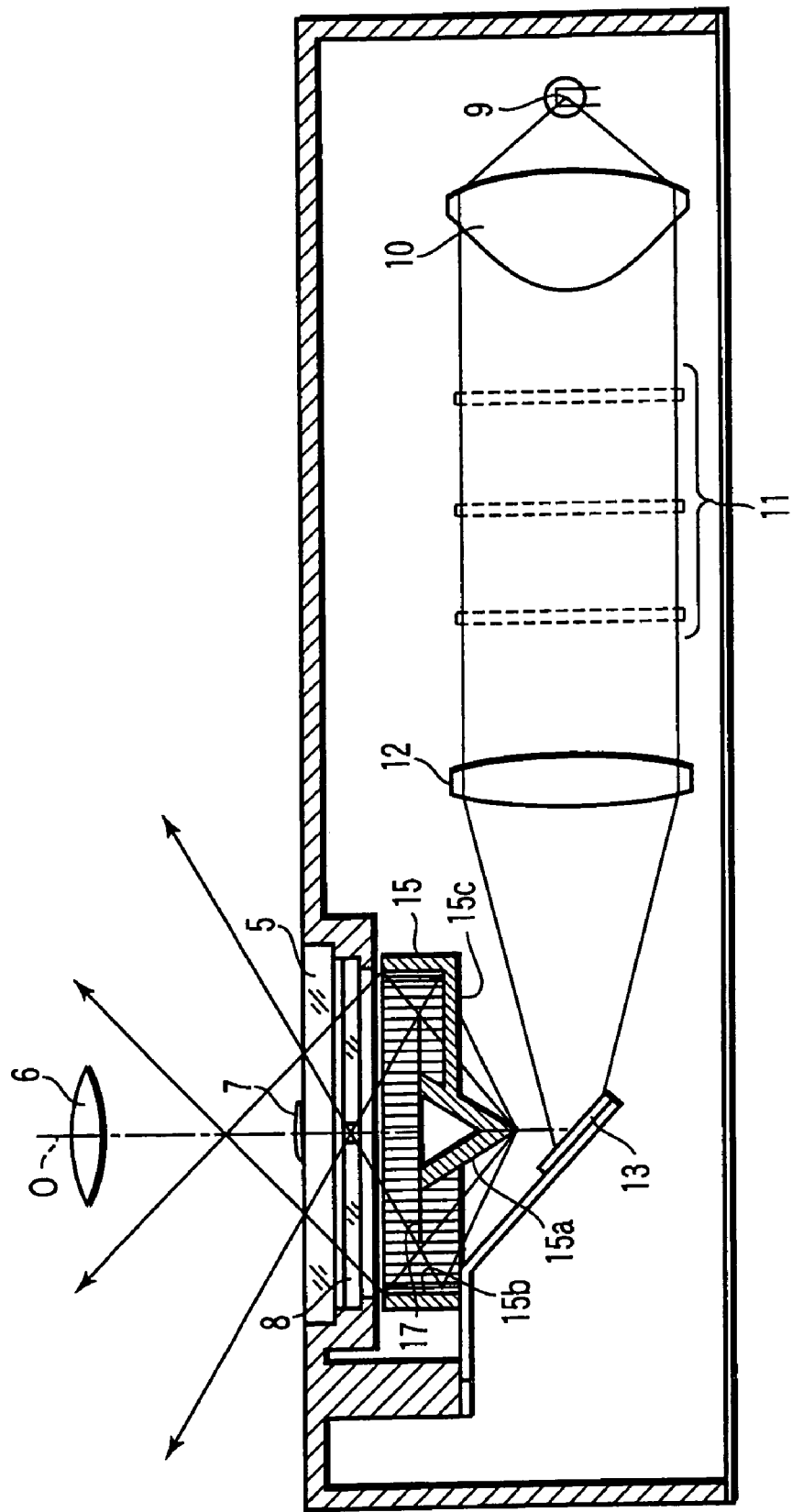
FIG. 3 shows a sectional configuration of the dark field illumination device in a fourth embodiment of the present invention.
Figure 4:
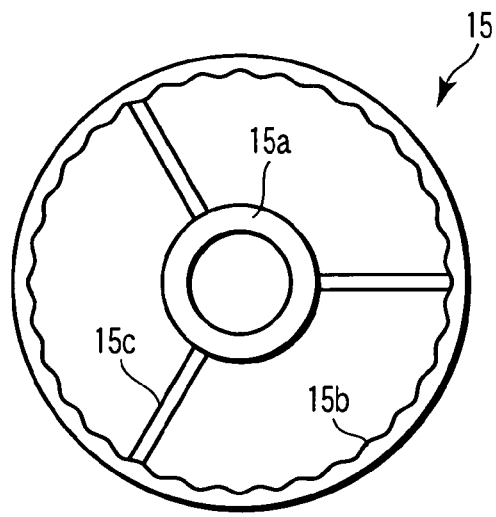
FIG. 4 is a plan view of a dark field mirror shown in FIG. 3 viewed from below.
Figure 5:
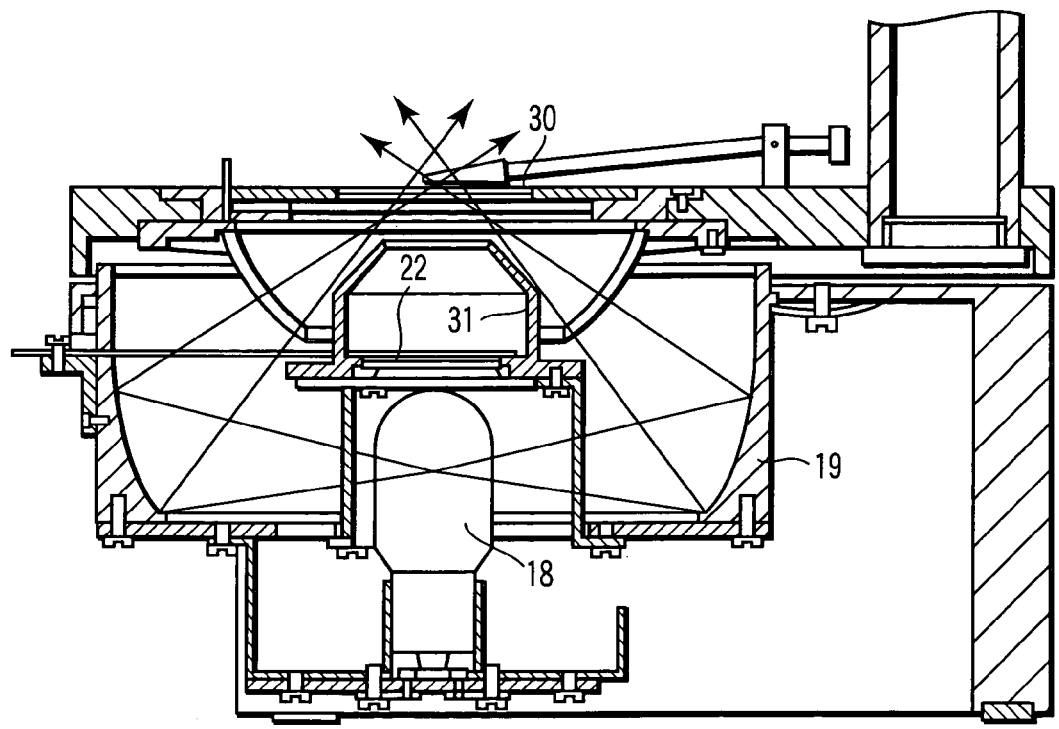
FIG. 5 shows a sectional configuration of an illumination device for performing dark field observation disclosed in Jpn. Pat. Appln. KOKAI Publication No. 45-11051.
Figure 6:
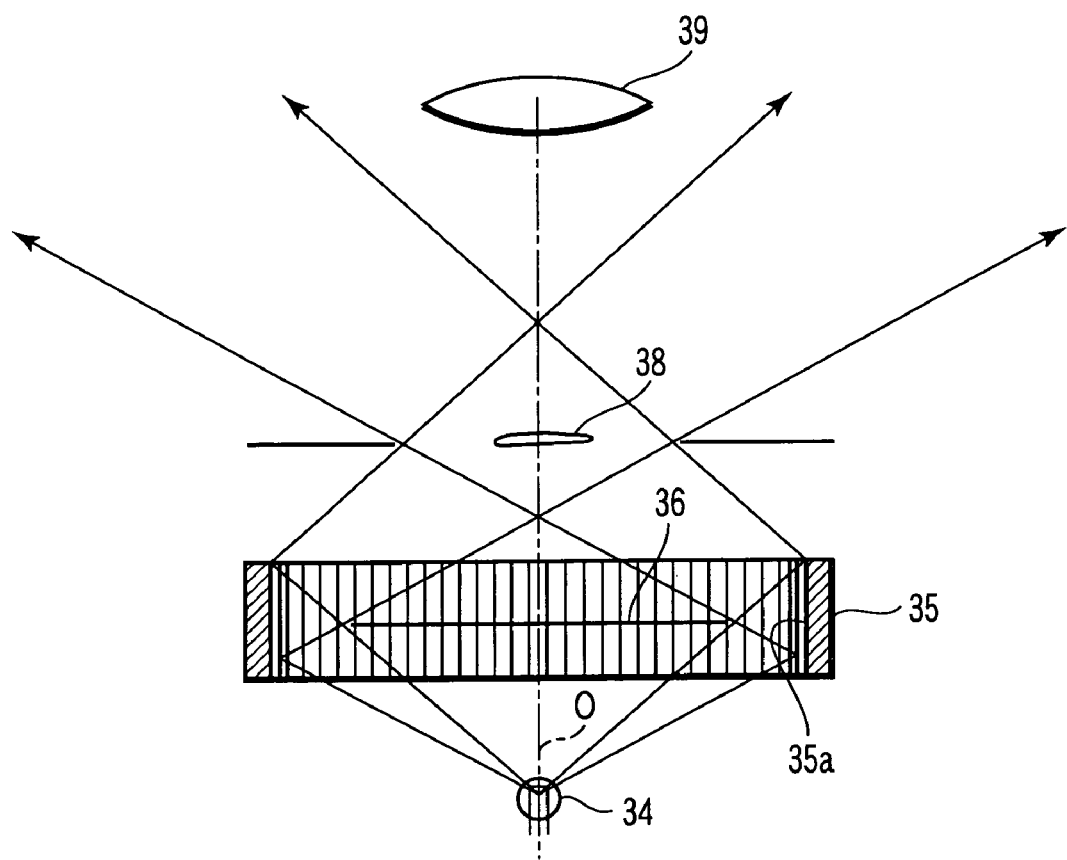
FIG. 6 shows a sectional configuration of an illumination device for performing the dark field observation disclosed in Jpn. Pat. Appln. KOKAI Publication No. 11-153755.

The present embodiment is directed to another dark field illumination device. FIG. 3 shows a sectional configuration of the dark field illumination device in a fourth embodiment of the present invention. FIG. 4 is a plan view of the dark field mirror shown in FIG. 3 viewed from below. In FIG. 3, members indicated by the same reference numerals as the members shown in FIG. 2 are similar members, and will not be described in detail.

As shown in FIG. 3, the dark field illumination device of the present embodiment comprises an illumination light source 9, which emits a bundle of illumination light rays, a collector lens 10, which converts the bundle of illumination light rays from the illumination light source 9 into a parallel bundle of light rays, a convex lens 12, which converts the parallel bundle of light rays into a converging bundle of light rays, various filters 11, which are disposed between the collector lens 10 and the convex lens 12, a mirror 13, which reflects the bundle of illumination light rays from the convex lens 12, and a dark field mirror 15.

As shown in FIG. 3 and FIG. 4, the dark field mirror 15 has a conical reflecting mirror 15a, a cylindrical mirror portion 15b whose inner surface is a mirror, and a link portion 15c linking the conical reflecting mirror 15a and the cylindrical mirror portion 15b. The conical reflecting mirror 15a directs the illumination light rays from the mirror 13 toward the cylindrical mirror portion 15b, and the cylindrical mirror portion 15b directs the illumination light rays from the conical reflecting mirror 15a toward the sample 7.

As shown in FIG. 3, the dark field illumination device further has a light shielding plate 17 for preventing the illumination light rays from the mirror 13 and the like from directly entering the objective lens 6. The light shielding plate 17 is provided on a rear side of the conical reflecting mirror 15a, that is, on the side of the sample.

The dark field illumination device of the present embodiment has the same advantage as in the first to third embodiments, and in addition, the illumination light source 9 is disposed laterally off the optical axis O of the observation optical system, thereby allowing a reduction of size along the optical axis O. Further, as the illumination light source 9 is away from the sample 7, undesired temperature increase of the sample 7 can be effectively prevented.

While the embodiments of the present invention have been described above referring to the drawings, the present invention is not limited to these embodiments, and various modifications and alterations may be made without departing from its spirit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A dark field illumination device to provide dark field illumination to a sample that is located on a stage glass and is to be observed by an observation optical system, the device comprising:
   an illumination light source which emits illumination light rays;
   a light shielding plate which is located between the sample and the illumination light source, and which selectively shields the illumination light rays that would directly enter the observation optical system among the illumination light rays emitted from the illumination light source;
   an optical member which directs toward the sample the illumination light rays passing outside the illumination light rays shielded by the light shielding plate; and
   a background member which is disposed between the sample and the light shielding plate, and which comprises a smooth surface on a side thereof facing the sample;
   wherein the illumination light rays that are directed toward the sample by the optical member illuminate the sample through the stage glass, and the background member attenuates light rays that are reflected by the stage glass among the illumination light rays directed toward the sample.

2. The device according to claim 1, wherein the smooth surface of the background member is a mirror surface.

3. The device according to claim 1, wherein the background member attenuates the illumination light rays reflected by the stage glass by absorption.

4. The device according to claim 3, wherein the background member further comprises an anti-reflection film provided on the smooth surface.

5. The device according to claim 1, wherein the background member attenuates the illumination light rays reflected by the stage glass by interference.

6. The device according to claim 1, wherein the background member further comprises an anti-reflection film provided on the smooth surface.

7. The device according to claim 1, wherein the optical member comprises a cylindrical mirror including a reflective surface on an inner surface thereof, and wherein a central axis of the cylindrical mirror is substantially coincident with an optical axis of the observation optical system.

8. The device according to claim 1, further comprising a dustproof waterproof glass provided between the sample and the background member.

9. The device according to claim 8, wherein the dustproof waterproof glass comprises an anti-reflection film provided on a surface thereof.

* * * * *